(12) United States Patent
Gabriel (10) Patent No.: US 12,483,570 B2
(45) Date of Patent: Nov. 25, 2025

(54) MALWARE TRAFFIC ANALYZER WITH DIRECT MALWARE DETONATION

(71) Applicant: HUMAN SECURITY, INC., New York, NY (US)

(72) Inventor: Cirlig Constantin Gabriel, London (GB)

(73) Assignee: HUMAN SECURITY, INC., New York, NY (US)

( * ) Notice: Subject to any disclaimer, the term of this patent is extended or adjusted under 35 U.S.C. 154(b) by 462 days.

(21) Appl. No.: 17/969,462

(22) Filed: Oct. 19, 2022

(65) Prior Publication Data

US 2024/0137374 A1    Apr. 25, 2024
US 2024/0236123 A9    Jul. 11, 2024

(51) Int. Cl.
*H04L 9/40*    (2022.01)
*G06F 8/61*    (2018.01)

(52) U.S. Cl.
CPC ............ *H04L 63/1425* (2013.01); *G06F 8/61* (2013.01)

(58) Field of Classification Search
CPC ......... H04L 63/1425; G06F 8/61; G06F 21/57
See application file for complete search history.

(56) References Cited

U.S. PATENT DOCUMENTS

| | | | | |
|---|---|---|---|---|
| 8,434,151 B1 * | 4/2013 | Franklin | ............... | H04L 63/145 |
| | | | | 717/134 |
| 9,195,829 B1 * | 11/2015 | Goradia | ................. | G06F 21/50 |
| 9,489,516 B1 * | 11/2016 | Lu | .......................... | G06F 21/567 |
| 10,397,255 B1 * | 8/2019 | Bhalotra | ............. | H04L 63/1425 |
| 10,846,405 B1 * | 11/2020 | Ciubotariu | ............ | G06F 21/554 |
| 10,956,573 B2 * | 3/2021 | Zheng | .................... | G06F 21/562 |
| 11,943,248 B1 * | 3/2024 | McGregory | ........ | H04L 61/4511 |
| 2014/0223566 A1 * | 8/2014 | Zaitsev | ................. | G06F 21/567 |
| | | | | 726/24 |
| 2016/0283716 A1 * | 9/2016 | Momot | ................. | G06F 21/566 |
| 2020/0104511 A1 * | 4/2020 | Stolfo | .................... | H04L 67/535 |
| 2021/0099476 A1 * | 4/2021 | Montgomery | ...... | H04L 63/1425 |
| 2021/0200872 A1 * | 7/2021 | Cannings | ................ | G06N 3/08 |
| 2024/0281531 A1 * | 8/2024 | Taylor | .................... | G06F 21/564 |
| 2024/0303344 A1 * | 9/2024 | Chiscariu | ................ | G06F 21/53 |
| 2025/0077682 A1 * | 3/2025 | Guttridge | ................ | G06N 3/045 |
| 2025/0181724 A1 * | 6/2025 | Lanson | ................... | G06F 21/54 |

* cited by examiner

*Primary Examiner* — Christopher A Revak
(74) *Attorney, Agent, or Firm* — SQUIRE PATTON BOGGS (US) LLP (57) ABSTRACT

Systems, methods, apparatuses, and computer program products for analyzing malware traffic with direct malware detonation. The method may include, retrieving a data package from a source database. The method may also include invoking an auto tester to generate an indicator on the data package. The method may further include installing, in response to the invocation, the data package on a user equipment. In addition, the method may include triggering malicious behavior on the user equipment. Further, the method may include implementing an emulation of at least one user event on the data package during the malicious behavior. The method may also include extracting a uniform resource locator, a header, or a request body generated by the user equipment.

14 Claims, 4 Drawing Sheets

MALWARE TRAFFIC ANALYZER WITH DIRECT MALWARE DETONATION

FIELD

Some example embodiments may generally relate to malicious or bot activity detection. For example, certain example embodiments may relate to apparatuses, systems, and/or methods for analyzing malware traffic with direct malware detonation.

BACKGROUND

Online security may relate to the process of developing, adding, and testing security features within non-mobile and mobile computing devices to prevent security vulnerabilities against threats, such as unauthorized modification and/or malicious activity or behavior. Securities against malware may be an important feature because computing devices connected over various networks and connected to the cloud may have increased vulnerabilities to security threats. Thus, there continues to be an increasing need to not only ensure security at the network level, but also within the individual computing devices and software applications installed and executed in the computing devices.

SUMMARY

Some example embodiments may be directed to a method. The method may include retrieving a data package from a source database. The method may also include invoking an auto tester to generate an indicator on the data package. The method may further include installing, in response to the invocation, the data package on a user equipment. In addition, the method may include triggering malicious behavior on the user equipment. Further, the method may include implementing an emulation of at least one user event on the data package during the malicious behavior. The method may also include extracting a uniform resource locator, a header, or a request body generated by the user equipment.

Other example embodiments may be directed to an apparatus. The apparatus may include at least one processor and at least one memory including computer program code. The at least one memory and computer program code may also be configured to, with the at least one processor, cause the apparatus at least to retrieve a data package from a source database. The apparatus may also be caused to invoke an auto tester to generate an indicator on the data package. The apparatus may further be caused to install, in response to the invocation, the data package on a user equipment. In addition, the apparatus may be caused to trigger malicious behavior on the user equipment. Further, the apparatus may be caused to implement an emulation of at least one user event on the data package during the malicious behavior. The apparatus may also be caused to extract a uniform resource locator, a header, or a request body generated by the user equipment.

Other example embodiments may be directed to an apparatus. The apparatus may include means for retrieving a data package from a source database. The apparatus may also include means for invoking an auto tester to generate an indicator on the data package. The apparatus may further include means for installing, in response to the invocation, the data package on a user equipment. In addition, the apparatus may include means for triggering malicious behavior on the user equipment. Further, the apparatus may include means for implementing an emulation of at least one user event on the data package during the malicious behavior. The apparatus may also include means for extracting a uniform resource locator, a header, or a request body generated by the user equipment.

In accordance with other example embodiments, a non-transitory computer readable medium may be encoded with instructions that may, when executed in hardware, perform a method. The method may include retrieving a data package from a source database. The method may also include invoking an auto tester to generate an indicator on the data package. The method may further include installing, in response to the invocation, the data package on a user equipment. In addition, the method may include triggering malicious behavior on the user equipment. Further, the method may include implementing an emulation of at least one user event on the data package during the malicious behavior. The method may also include extracting a uniform resource locator, a header, or a request body generated by the user equipment.

Other example embodiments may be directed to a computer program product that performs a method. The method may include retrieving a data package from a source database. The method may also include invoking an auto tester to generate an indicator on the data package. The method may further include installing, in response to the invocation, the data package on a user equipment. In addition, the method may include triggering malicious behavior on the user equipment. Further, the method may include implementing an emulation of at least one user event on the data package during the malicious behavior. The method may also include extracting a uniform resource locator, a header, or a request body generated by the user equipment.

Other example embodiments may be directed to an apparatus that may include circuitry configured to retrieve a data package from a source database. The apparatus may also include circuitry configured to invoke an auto tester to generate an indicator on the data package. The apparatus may further include circuitry configured to install, in response to the invocation, the data package on a user equipment. In addition, the apparatus may include circuitry configured to trigger malicious behavior on the user equipment. Further, the apparatus may include circuitry configured to implement an emulation of at least one user event on the data package during the malicious behavior. The apparatus may also include circuitry configured to extract a uniform resource locator, a header, or a request body generated by the user equipment.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for analyzing malware traffic with direct malware detonation. For instance, in certain embodiments, malware may be analyzed by directly detonating malware on live devices.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments. Additionally, usage of "detonating," or other similar language, throughout this specification may also refer to "executing," "execute," or "execution."

Figure 1:
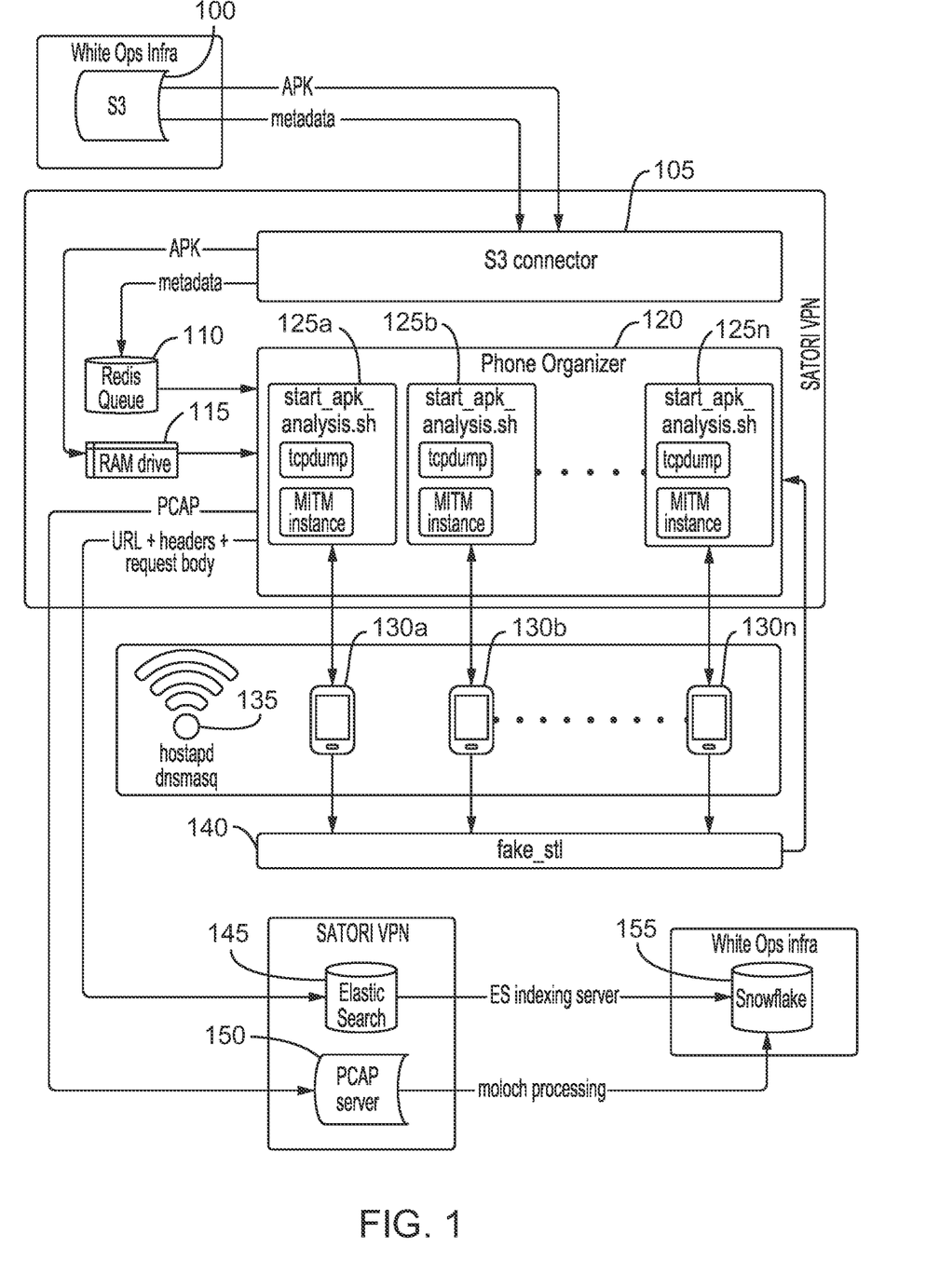
FIG. 1 illustrates a dynamic pipeline architecture, according to certain example embodiments.

FIG. 1 illustrates a dynamic pipeline architecture, according to certain example embodiments. According to certain example embodiments, the dynamic pipeline architecture may be configured to perform a series of analyses on a set of artifacts (i.e., samples such as applications that can be installed on mobile phones) by applying a stimulus to each artifact in a runtime environment. In certain example embodiments, the dynamic pipeline architecture may be based on real devices, and the artifacts may be installed on mobile or stationary devices such as, for example user equipment (UEs) (i.e., phones), desktop computers, mobile computers, and/or similar devices. Once installed, the artifacts may be poked (i.e., probed, examined, or inspected) for a specific amount of time while traffic originating from the device(s) is recorded. The traffic may then be parsed and analyzed, and uploaded to a data storage database for storage.

In certain example embodiments, the dynamic pipeline architecture may be made up of software and hardware components. For instance, the software components may include a set of services that pull data packages, samples, or files (e.g., software computer applications, android package (APK)) from a simple storage service (S3) bucket into a local buffer. The set of services may also manage available phones, and provide instructions to automatically deploy and analyze the data packages. In certain example embodiments, data packages may include certain operating system (OS) level components such as, for example, an open virtual private network (OVPN) daemon (i.e., executable file related to a security program that enables users to browse anonymously to protect sensitive information). The OVPN daemon may place the device (e.g., Raspberry PI (RPI)) inside a Satori VPN so that it may have access to a packet capture (PCAP) repository or storage, and an elastic search server. In other example embodiments, the data packages may also include a set of services that build an access point (AP) and the necessary iptables to route packets around from the AP to the mobile devices.

According to certain example embodiments, the hardware components of the dynamic pipeline architecture may include a set of actual devices that provide a connection between the software environment and the mobile phones where the artifacts are installed. For instance, the hardware setup may include a microcontroller board or computer such as, for example, a RPI 4B 4 GB RAM platform where scripts are deployed. The RPI may include a power supply for supplying power to the RPI. The hardware components may also include a 10-port 60 W data hub used for extending a number of USB ports while also maintaining a required power to the phones. In addition, multiple USB C cables may be provided. In some example embodiments, 4 USB C cables may be provided/used. However, in other example embodiments, more or less USB C cables may be provided/used. Further, the hardware components may include an Alfa Network that builds a wireless network to which the mobile phones may connect. Additionally, the hardware components may include a portable cooling pad for managing overall heat of the architecture, and include an RPI case, heatsink, and fan for managing RPI heat.

As illustrated in FIG. 1, the dynamic pipeline architecture may include an S3 bucket 100 that may serve as an ingress point of the pipeline. The S3 bucket may be periodically monitored by an S3 connector 105, and any APK that is present in the S3 bucket 100 may be automatically ingested by the pipeline. In other words, the APK present in the S3 bucket 100 may be downloaded by the S3 connector 105 locally on the RPI, enqueued for processing and installed on a phone when one is free. Additionally, in some example embodiments, each time the APK is ingested, the APK may be removed from the S3 bucket 100. According to certain embodiments, the S3 connector 105 may correspond to a software module installed on the RPI.

According to certain example embodiments, the S3 bucket 100 may be connected to an S3 connector 105 via a service account. Additionally, the S3 connector 105 may download the APK from the S3 bucket 100 along with associated metadata as long as there is a predefined amount of available space on the RPI (e.g., 8 GB). According to certain example embodiments, the metadata may include information about the minimum Android version required for detonation, and the required processor architecture. In some example embodiments, the metadata may be pushed to a Redis queue 110 while the APK may be saved locally at a RAM drive 115 to await processing. In other example embodiments, the metadata may be removed from the queue via Redis' application programming interface (API).

As illustrated in FIG. 1, the dynamic pipeline architecture may also include a phone organizer 120 (i.e., device organizer) that may be capable of retrieving the APK from the S3 bucket 100. In some example embodiments, the phone organizer 120 may be a software module installed on the RPI. Once the device organizer obtains the APK, the device organizer may push the APK toward phones 130a, 130b, 130n. According to certain example embodiments, the device organizer may be a simple script that monitors the status of a sample (i.e., APK) through its lifecycle on the phones 130a, 130b, 130n. In some example embodiments, the device organizer may include a continuously running daemon that monitors the metadata in the Redis queue in real time.

Additionally, once a phone/emulator instance is available, the device organizer may invoke an "auto tester" that generates indicators of compromise (IOCs). That is, in some example embodiments, the phone/emulator instance may refer to the fact that the device farm supports both real devices and emulator instances to be connected to it. As long as an Android debug bridge (ADB) "sees" the emulator or phone sessions, it may connect to them all and leverage them for detonation. After the analysis (i.e., IOC gathering process which may include installation of the APK, injecting touches, rebooting the phone, and extracting URLs that were seen in the session's network capture) is completed, a cleanup may be performed where the APK and all of the artifacts are removed from the phone.

In certain example embodiments, the device organizer may include one or more auto testers 125a, 125b, 125n, which may each be associated with a corresponding phone 130a, 130b, 130n. According to certain example embodiments, the auto tester 125a, 125b, 125n may install the APK on a corresponding phone 130a, 130b, 130n via a debug bridge such as, for example, an ADB. In certain example embodiments, the ADB may grant the phones all the required permissions from the start, and then starts an IOC gathering process, which, as described below, may be performed sequentially. According to certain example embodiments, the IOC gathering process may include running an Android Monkey program over the software application (i.e., APK) for a predefined amount of time. The IOC gathering process may also include setting a clock of the phone to one week after the current date, and disabling airplane mode while enabling Wi-Fi. The phone 130a, 130b, 130n may be rebooted, and the software application installed in the phone may be started for a predefined amount of time such as, for example 1 second, and then a home button of the phone may be pressed. In other example embodiments, the predefined amount of time is not limited to 1 second, and may be more or less than 1 second. Further, the IOC gathering process may include turning on and off the screen of the phone multiple times (i.e., 5 times), and allowing the phone to sit idly for a predefined amount of time (i.e., 2 minutes) with the screen off.

As illustrated in FIG. 1, the phones 130a, 130b, 130n may be in communication with other components of the dynamic pipeline architecture via Wi-Fi, and a fake smartphone test farm (STF) 140 may be implemented in the phones 130a, 130b, 130n. Additionally, in some example embodiments, the phones may have secure sockets layer (SSL) decryption. According to certain example embodiments, the fake STF may correspond to a legacy adapter that may be used in conjunction with STF. The fake STF may aggregate all the connected devices in a way that is digestible by the other systems present on the RPI.

According to certain example embodiments, PCAP and URL, headers, and request body may be extracted from the device organizer 120. In certain example embodiments, the URLs may be extracted from a man-in-the-middle proxy (MITMProxy) session that ran while the application was installed and touches were injected in the phone. The URLs may correspond to real URLs to which the phone was connected. In other example embodiments, PCAP may correspond to the traffic capture file used in the industry, and the headers may correspond to an HTTP header. That is, the headers may correspond to a field of an HTTP request or response that passes additional context and metadata about the request or response. As illustrated in FIG. 1, the URL, headers, and request body may be obtained by an elastic search engine 145. According to certain example embodiments, the elastic search engine 145 may provide certain capabilities including, for example storing, searching, and analyzing large volumes of data quickly and in near real time. As further illustrated in FIG. 1, the PCAP may be obtained by a PCAP server 150, which may be capable of intercepting data packets traveling over a network. In certain example embodiments, data/traffic obtained by the PCAP server 150 may be parsed and analyzed via a moloch processing procedure (i.e., PCAP ingestion system), and then forwarded to a snowflake cloud server 155 where the data/traffic may be further analyzed.

As previously noted, the dynamic pipeline architecture may include an input that serves a source of the set of APKs, and optionally metadata that can target a specific version of an operating system or a certain processor architecture (work in progress (WIP)). The input to the pipeline may also be performed manually such as, for example, by an operator who is responsible to select APKs to be analyzed, and upload them to the ingress point of the pipeline. Further, in certain example embodiments, additional data may be used to perform a dynamic analysis. For instance, the dynamic analysis pipeline may utilize an 'apktool' to perform a specific action. This output may be taken directly from a static analysis pipeline, which may correspond to a system that extracts information about an APK such as its activities. In certain example embodiments, if this information is not present (i.e., when the sample is submitted manually), it may be extracted locally by a failsafe script and populate a minimum of required fields (such as the main activity name). In addition to an input, the dynamic pipeline architecture may include an output of the dynamic analysis, which may include a set of snowflake tables that include the URLs and headers/body of the request. As previously noted, the HTTP header may correspond to a field of an HTTP request or response that passes additional context and metadata about the request or response. Further, the HTTP body data may correspond to data bytes transmitted in an HTTP transaction message immediately following the headers if there is any. Additionally, the HTTP request may be made by a client, to a named host, which may be located on a server.

Figure 2:
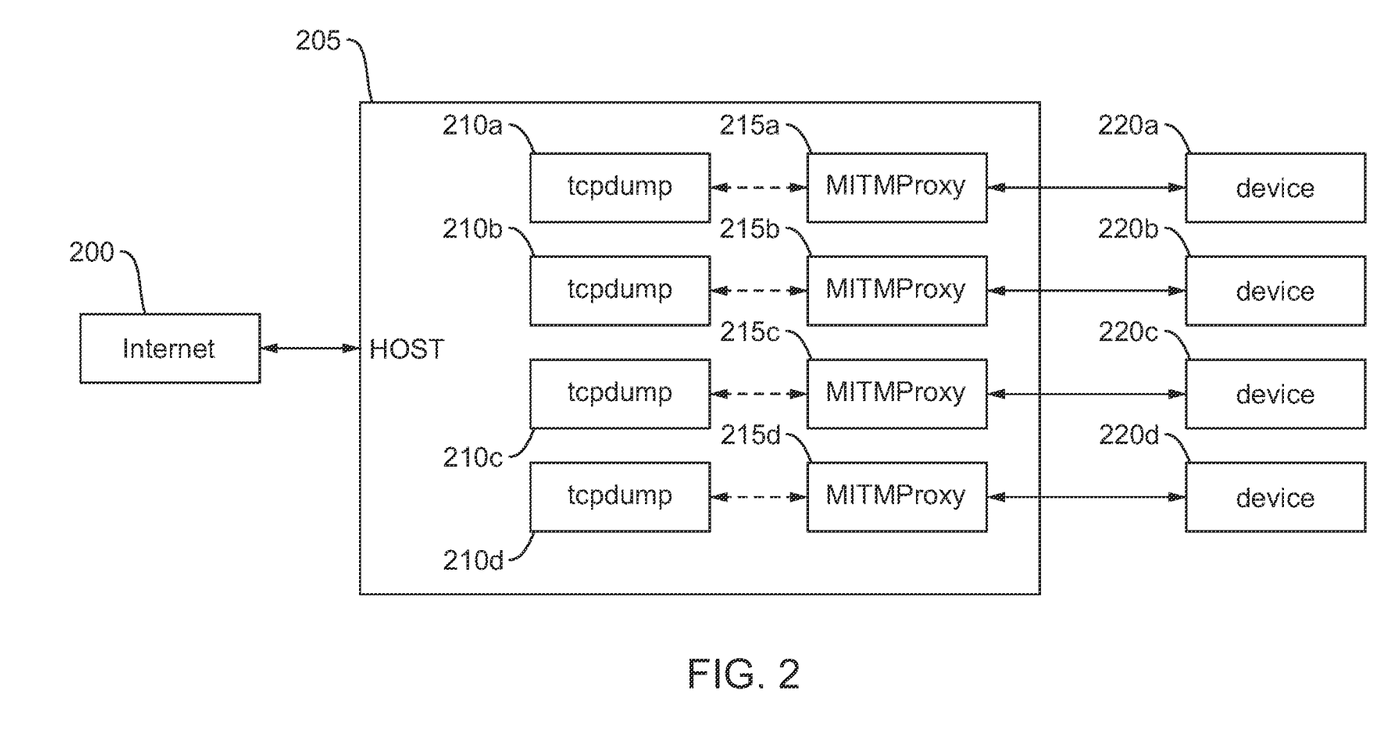
FIG. 2 illustrates a device and network architecture, according to certain example embodiments.

FIG. 2 illustrates a device and network architecture, according to certain example embodiments. As illustrated in FIG. 2, the devices 220a, 220b, 220c, 220d (i.e., phones) may get their network connection from an access point generated by a device manager 205 (e.g., RPI), which may be connected to the Internet 200. According to certain example embodiments, in order to correlate the traffic from which it originated, a tcpdump 210a, 210b, 210c, 210d (i.e., tcpdump of the phone organizer 120 in FIG. 1) and MITM session (proxy) (MITM instance in FIG. 1) 215a, 215b, 215c, 215d may be started upon the start of the analysis (i.e., analysis (FIG. 1) of the traffic from the APKs when the system is infected with malware) with a filter on top that searches for an Internet protocol (IP) address of the client device 220a, 220b, 220c, 220d (i.e., phones). In some example embodiments, the IP of the client device may be determined at the beginning of the session. Thus, according to certain example embodiments, requests from the phone may be routed through the tcpdump 210a, 210b, 210c, 210d first, and then to the MITMProxy 215a, 215b, 215c, 215d before finally reaching its destination, which may correspond to the final target of the data packet (i.e., a website or host). In doing so, this may be able to prevent MITMProxy 215a, 215b, 215c, 215d memory leaks for long sessions since having one large instance may be prone to crashes and data loss. In addition, routing the requests in this manner may provide an organized separation between the devices 220a, 220b, 220c, 220d.

Figure 3:
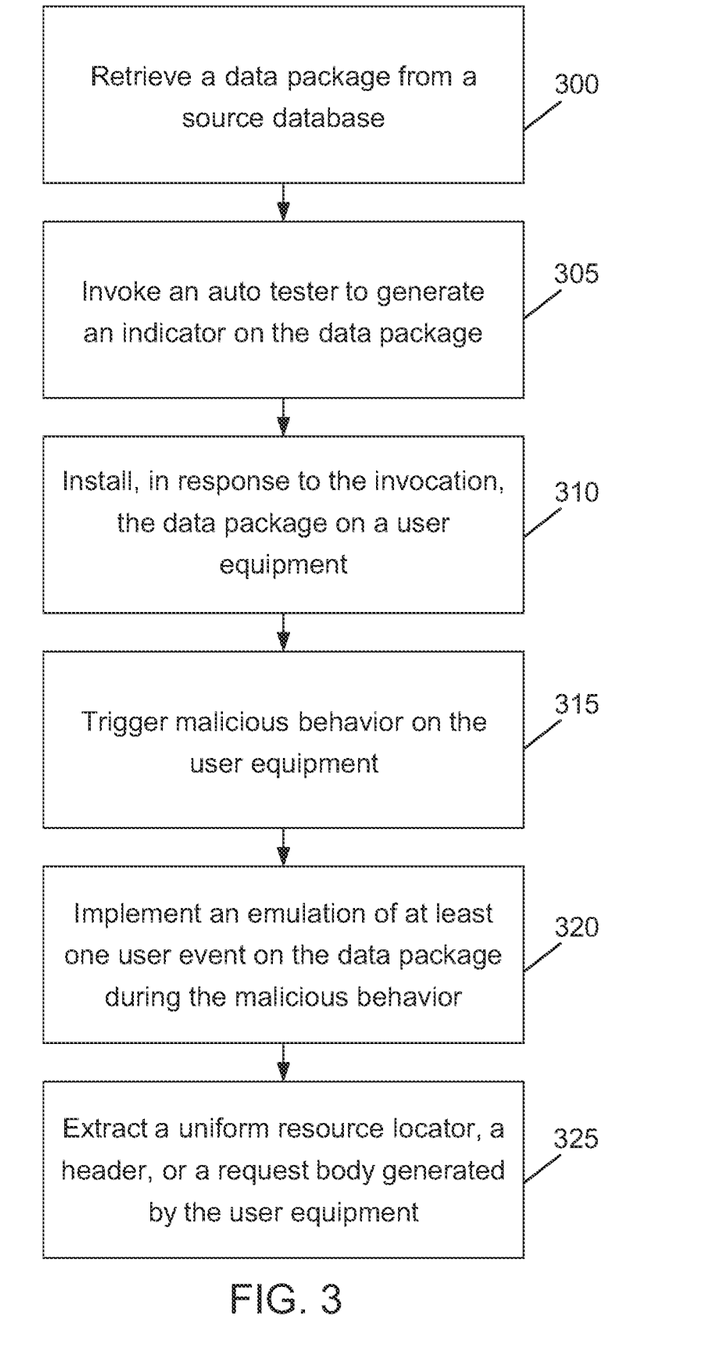
FIG. 3 illustrates an example flow diagram of a method, according to certain example embodiments.

FIG. 3 illustrates an example flow of a method, according to certain example embodiments. In an example embodiment, the method of FIG. 3 may be performed by a computing device. For instance, in an example embodiment, the method of FIG. 3 may be performed by a computer, server, or mobile computing device that may be similar to or included in apparatus 10 illustrated in FIG. 4. It should be noted that one of ordinary skill in the art would understand that apparatus 10 may include components or features not shown in FIG. 4.

According to certain example embodiments, the method of FIG. 3 may include, at 300, retrieving a data package from a source database. The method may also include, at 305, invoking an auto tester to generate an indicator on the data package. The method may further include, at 310, installing, in response to the invocation, the data package on a user equipment. In addition, the method may include, at 315, triggering malicious behavior on the user equipment. Further, the method may include, at 320, implementing an emulation of at least one user event on the data package during the malicious behavior. The method may also include, at 325, extracting a uniform resource information (e.g., uniform resource locator), a header, or a request body generated by the user equipment.

According to certain example embodiments, the malicious behavior may include at least one of setting a clock of the auto tester for a future date, rebooting the user equipment, adjusting an on or off screen feature of the user equipment, activating an idle mode of the user equipment. According to some example embodiments, the auto tester may be invoked based on an available user equipment instance. According to other example embodiments, the method may also include correlating traffic associated with the user equipment by initiating a packet analyzer and a proxy. In certain example embodiments, the proxy may be configured to capture incoming and outgoing data from the APK installed on the user equipment, and the packet analyzer may be configured to intercept and display traffic captured by the proxy.

In some example embodiments, the method may also include applying a filter to the packet analyzer and the proxy. In other example embodiments, the method may further include routing a request from the user equipment through the packet analyzer first, and then through the proxy.

Figure 4:
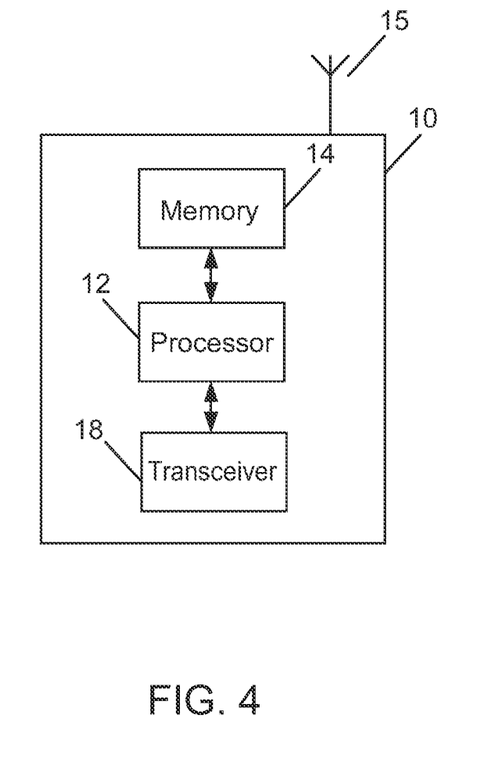
FIG. 4 illustrates an apparatus, according to certain example embodiments.

FIG. 4 illustrates an apparatus 10 according to certain example embodiments. In certain example embodiments, apparatus 10 may be a computer, mobile computing device, network device, server, or other similar device. It should be noted that one of ordinary skill in the art would understand that apparatus 10 may include components or features not shown in FIG. 4, and apparatus 10 may be in communication (i.e., connected to either via wire or wirelessly) with other similar computer devices forming a network of connected computer devices.

In some example embodiments, apparatus 10 may include one or more processors, one or more computer-readable storage medium (for example, memory, storage, or the like), one or more radio access components (for example, a modem, a transceiver, or the like), and/or a user interface. It should be noted that one of ordinary skill in the art would understand that apparatus 10 may include components or features not shown in FIG. 4.

As illustrated in the example of FIG. 4, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 4, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-3.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-3.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may include other components, such as filters, converters signal shaping components, and the like, to process symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to certain example embodiments, processor 12 and memory 14 may be included in or may form a part of processing circuitry or control circuitry. In addition, in some example embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of a hardware circuit or processor (or multiple processors), or portion of a hardware circuit or processor, and its accompanying software and/or firmware.

In certain example embodiments, apparatus 20 may be controlled by memory 24 and processor 22 to retrieve a data package from a source database. Apparatus 20 may also be controlled by memory 24 and processor 22 to invoke an auto tester to generate an indicator on the data package. Apparatus 20 may further be controlled by memory 24 and processor 22 to install, in response to the invocation, the data package on a user equipment. In addition, apparatus 20 may be controlled by memory 24 and processor 22 to trigger malicious behavior on the user equipment. Further, apparatus 20 may be controlled by memory 24 and processor 22 to implement an emulation of at least one user event on the data package during the malicious behavior. Apparatus 20 may also be controlled by memory 24 and processor 22 to extract a uniform resource locator, a header, or a request body generated by the user equipment.

In some example embodiments, an apparatus (e.g., apparatus 10) may include means for performing a method, a process, or any of the variants discussed herein. Examples of the means may include one or more processors, memory, controllers, transmitters, receivers, sensors, and/or computer program code for causing the performance of the operations.

Certain example embodiments may further be directed to an apparatus that includes means for performing any of the methods described herein including, for example, means for retrieving a data package from a source database. The apparatus may also include means for invoking an auto tester to generate an indicator on the data package. The apparatus may further include means for installing, in response to the invocation, the data package on a user equipment. In addition, the apparatus may include means for triggering malicious behavior on the user equipment. Further, the apparatus may include means for implementing an emulation of at least one user event on the data package during the malicious behavior. The apparatus may also include means for extracting a uniform resource locator, a header, or a request body generated by the user equipment.

Certain example embodiments described herein provide several technical improvements, enhancements, and/or advantages. In some example embodiments, it may be possible to increase the accuracy of a detonation by orders of magnitude, especially when it comes to adware. For instance, ad software development kits (SDKs) may come with complex emulation detection systems that may be difficult to bypass using traditional techniques. By detonating the samples on real devices, it may be possible to increase the chances of getting invalid traffic during an analysis as opposed to regular emulation.

As described herein, a computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of code may be in a source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments.

Partial Glossary

ADB Android Debug Bridge
APK Android Package
API Application Programming Interface
IOC Indicators of Compromise
OVPN Open Virtual Private Network PCAP Packet Capture
RPI Raspberry PI
S3 Simple Storage Service
STF Smartphone Test Farm

I claim:

1. A method, comprising:
retrieving a data package from a source database;
invoking an auto tester to generate indicators of compromise corresponding to types of malicious behavior on the data package;
triggering the malicious behavior on a user equipment by installing, in response to the invocation, the data package on the user equipment;
implementing an emulation of at least one user event on the data package during the malicious behavior; and
extracting a uniform resource locator, a header, or a request body generated by the user equipment,
wherein the malicious behavior comprises at least one of
setting a clock of the auto tester for a future date;
rebooting the user equipment;
turning on or off a screen of the user equipment; or
activating an idle mode of the user equipment.

2. The method according to claim 1, wherein the auto tester is invoked based on an available user equipment instance.

3. The method according to claim 1, further comprising:
correlating traffic associated with the user equipment by initiating a packet analyzer and a proxy,
wherein the proxy is configured to capture incoming and outgoing data from the data package installed on the user equipment, and
wherein the packet analyzer is configured to intercept and display traffic captured by the proxy.

4. The method according to claim 3, further comprising:
applying a filter to the packet analyzer and the proxy.

5. The method according to claim 3, further comprising:
routing a request from the user equipment through the packet analyzer first, and then through the proxy.

6. A dynamic malware traffic analyzer system, comprising:
a simple storage service comprising at least one data package;
a service connector connected to the simple storage service, wherein the service connector is configured to download the at least one data package from the simple storage service;
a device organizer configured to
retrieve and process the at least one data package stored at the service connector,
invoke an auto tester to generate indicators of compromise corresponding to types of malicious behavior on the data package, and
trigger the malicious behavior on a user equipment by installing, in response to the invocation, the data package on the user equipment; and
at least one user equipment in communication with the device organizer,
wherein the malicious behavior comprises at least one of
setting a clock of the auto tester for a future date;
rebooting the user equipment;
turning on or off a screen of the user equipment; or
activating an idle mode of the user equipment.

7. The dynamic malware traffic analyzer system according to claim 6, wherein the device organizer is configured to implement an emulation of at least one user event on the at least one data package.

8. The dynamic malware traffic analyzer system according to claim 6,
wherein the device organizer comprises
a proxy configured to capture ingoing and outgoing data from the at least one data package, and
a packet analyzer configured to intercept and display traffic captured by the proxy.

9. The dynamic malware traffic analyzer system according to claim 6, further comprising:
an elastic search server configured to store, search, and analyze.

10. A non-transitory computer readable medium encoded with a computer program, the computer program comprising computer executable code, which, when executed by a processor, causes the processor to:
retrieve a data package from a source database;
invoke an auto tester to generate indicators of compromise corresponding to types of malicious behavior on the data package;
trigger the malicious behavior on a user equipment by installing, in response to the invocation, the data package on a user equipment;
implement an emulation of at least one user event on the data package during the malicious behavior; and
extract a uniform resource locator, a header, or a request body generated by the user equipment,
wherein the malicious behavior comprises at least one of
setting a clock of the auto tester for a future date;
rebooting the user equipment;
turning on or off a screen of the user equipment; or
activating an idle mode of the user equipment.

11. The computer program according to claim 10, wherein the auto tester is invoked based on an available user equipment instance.

12. The computer program according to claim 10, wherein computer program comprising computer executable code, which, when executed by a processor, further causes the processor to:
correlate traffic associated with the user equipment by initiating a packet analyzer and a proxy,
wherein the proxy is configured to capture ingoing and outgoing data from the data package installed on the user equipment, and
wherein the packet analyzer is configured to intercept and display traffic captured by the proxy.

13. The computer program according to claim 12, wherein computer program comprising computer executable code, which, when executed by a processor, further causes the processor to:
apply a filter to the packet analyzer and the proxy.

14. The computer program according to claim 12, wherein computer program comprising computer executable code, which, when executed by a processor, further causes the processor to:
route a request from the user equipment through the packet analyzer first, and then through the proxy.

* * * * *